United States Patent
Kuo

[19]

[11] Patent Number: 6,116,701
[45] Date of Patent: Sep. 12, 2000

[54] DETACHABLE LUGGAGE WHEEL STRUCTURE

[75] Inventor: Chung-Hsien Kuo, Pan-Chiao, Taiwan

[73] Assignee: Chaw Khong Technology Co., Ltd., Taipei, Taiwan

[21] Appl. No.: 09/299,096

[22] Filed: Apr. 26, 1999

[30] Foreign Application Priority Data

Dec. 29, 1998 [TW] Taiwan ................................. 87221710

[51] Int. Cl.⁷ .............................. B60B 19/00; A45C 5/14
[52] U.S. Cl. ........................ 301/111; 301/125; 190/18 A
[58] Field of Search ........................ 301/5.1, 111, 120,
301/121, 124.1, 126, 131, 132; 190/18 A,
25, 37, 100

[56] References Cited

U.S. PATENT DOCUMENTS

| | | | |
|---|---|---|---|
| 2,978,277 | 4/1961 | Gaudry | 301/111 |
| 4,192,408 | 3/1980 | Walker | 190/18 A |
| 4,463,840 | 8/1984 | Seynhaeve | 190/18 A |
| 5,529,323 | 6/1996 | vom Braucke et al. | 301/112 X |
| 5,921,635 | 7/1999 | Deliman et al. | 301/125 X |

*Primary Examiner*—Russell D. Stormer
*Attorney, Agent, or Firm*—Dougherty & Troxell

[57] ABSTRACT

A detachable luggage wheel structure is disclosed. The detachable luggage wheel structure comprises a pedestal, a wheel assembly located on a lower part of the pedestal, a fixed member provided on the pedestal, a bolt, and a block secured to the fixed member from the below by the bolt for preventing the wheel axis from unfastening. Moreover, the wheel detachment is complete simply by unfastening the bolt from the exterior of the luggage and extracting the wheel thereof.

8 Claims, 8 Drawing Sheets

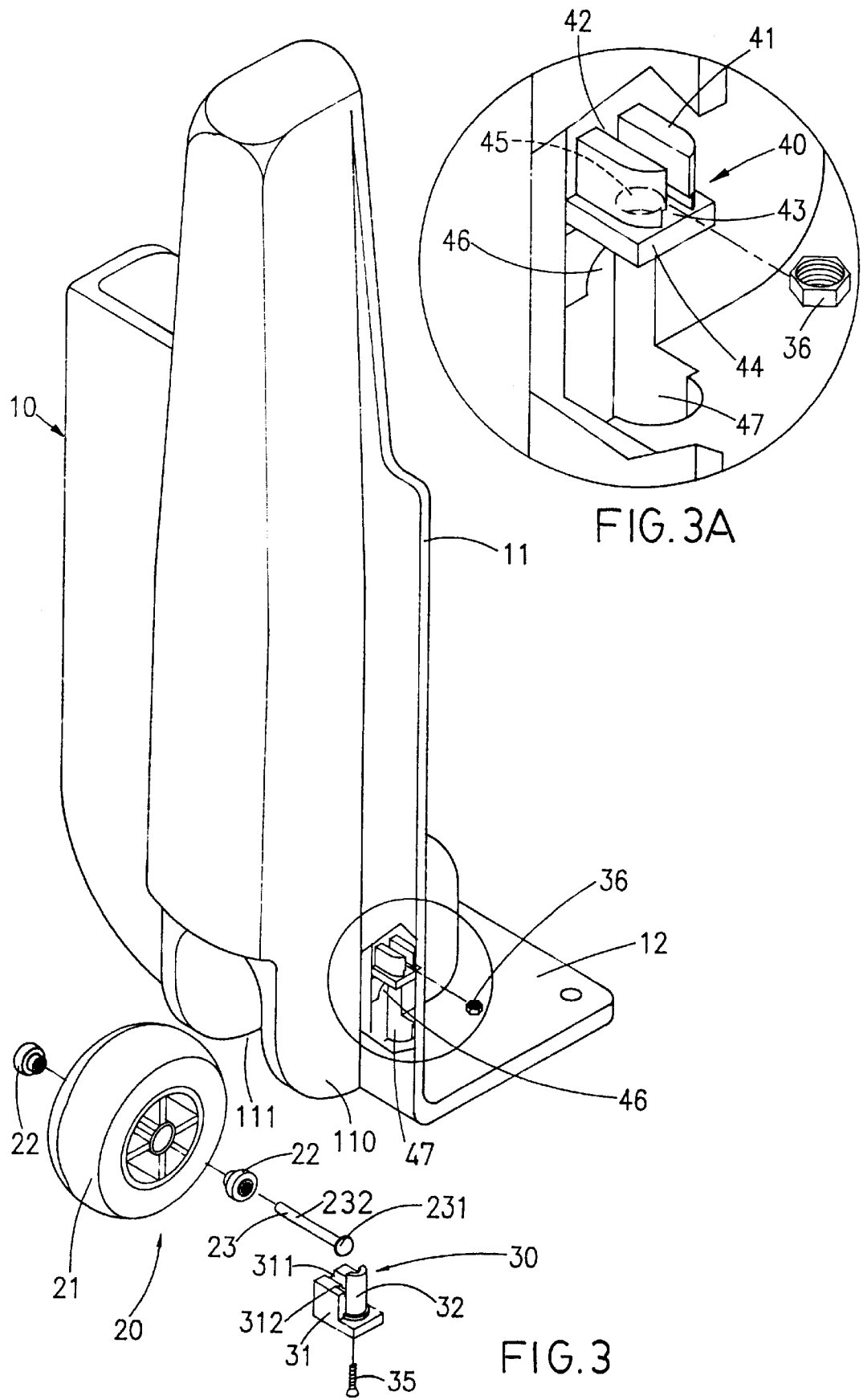

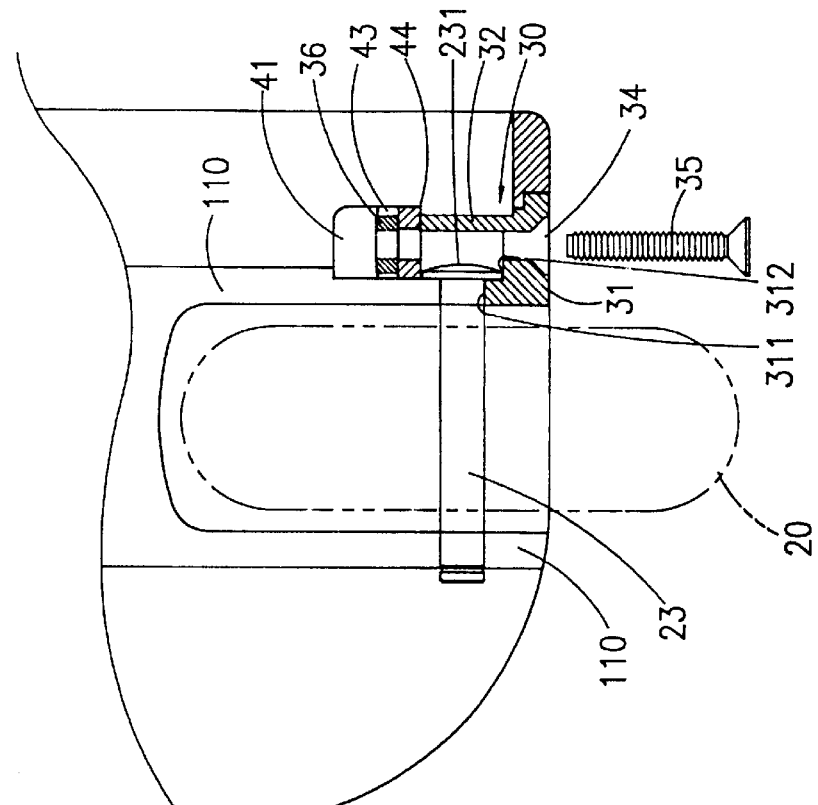
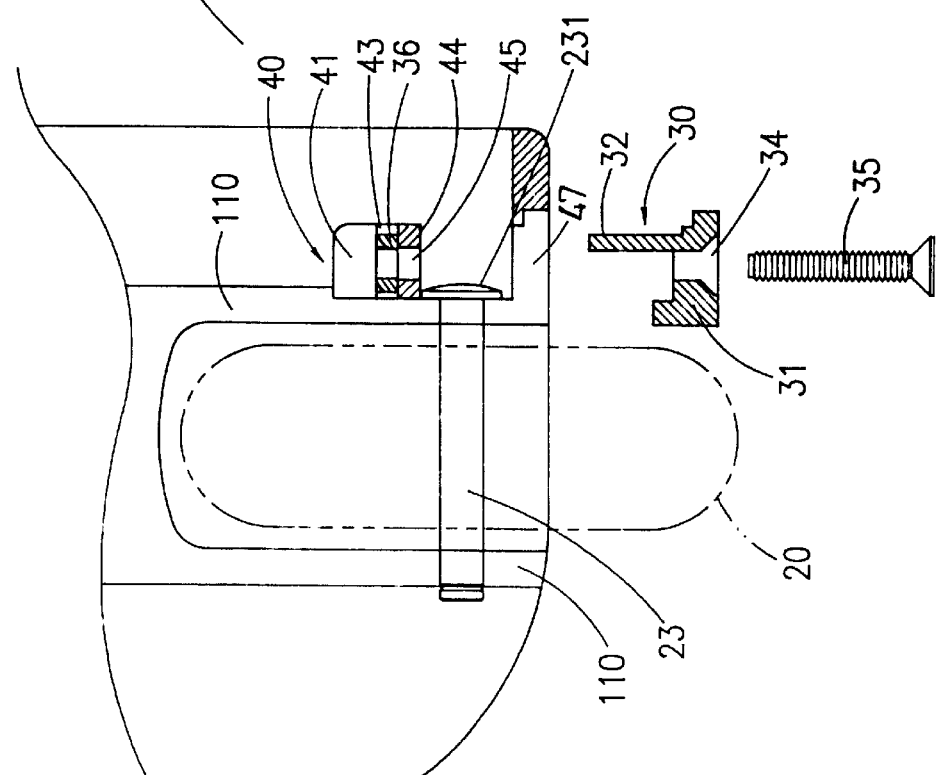

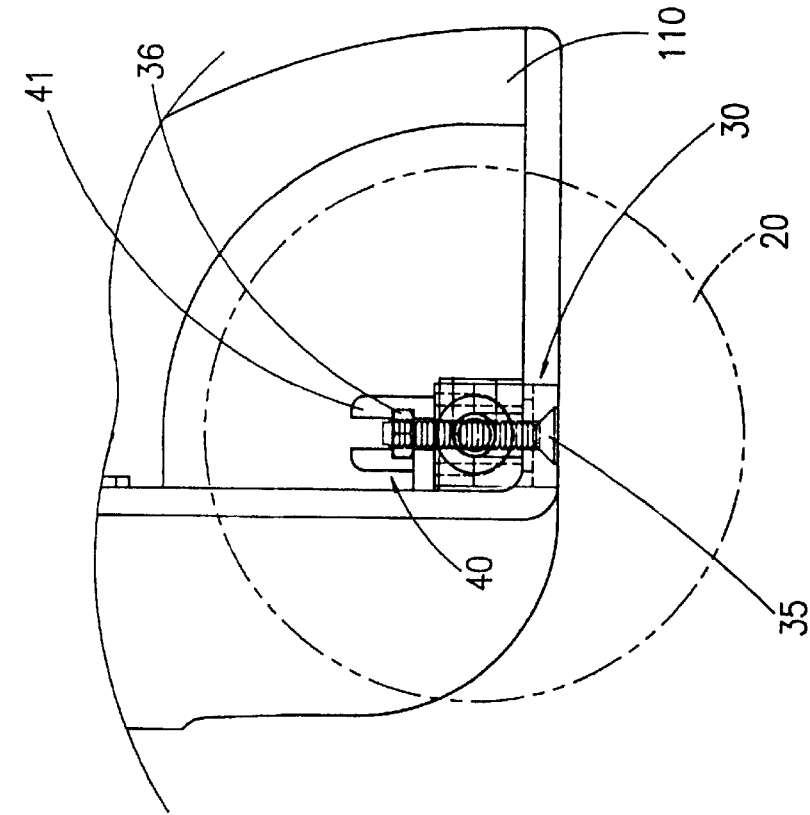
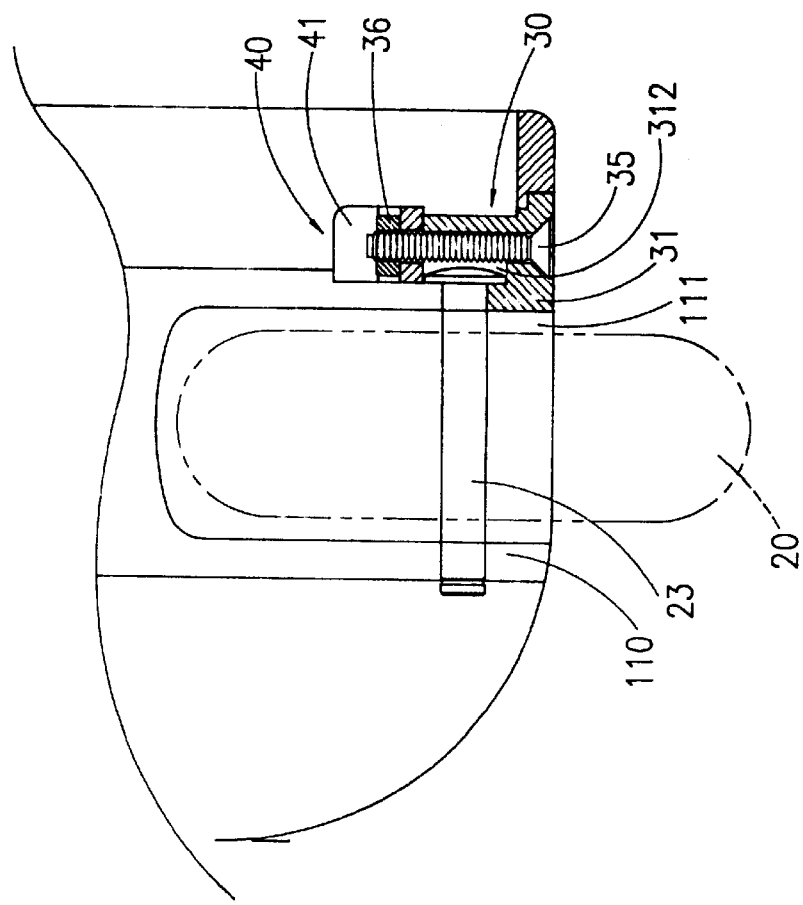

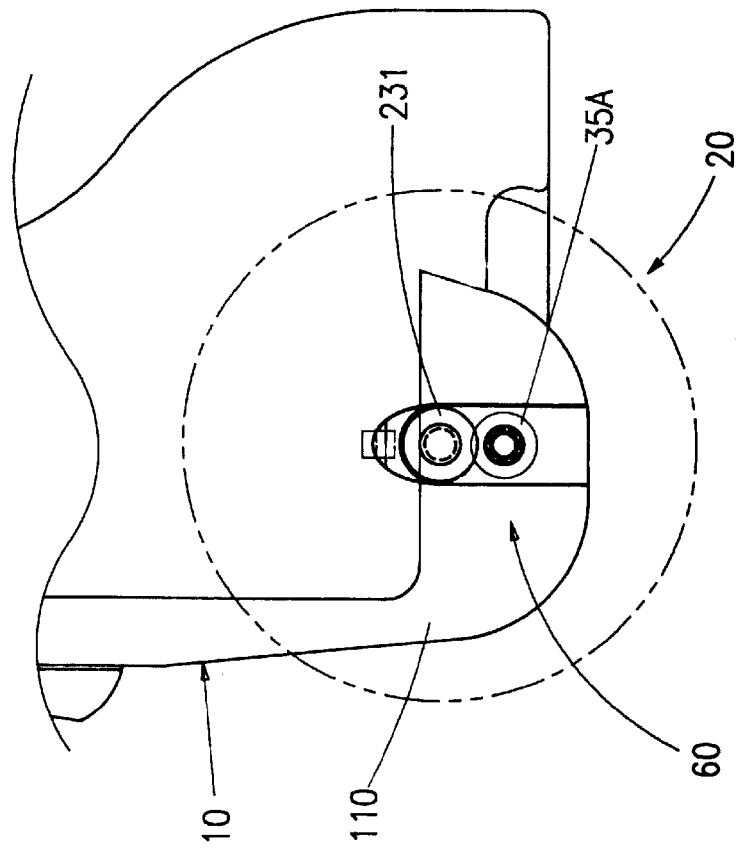
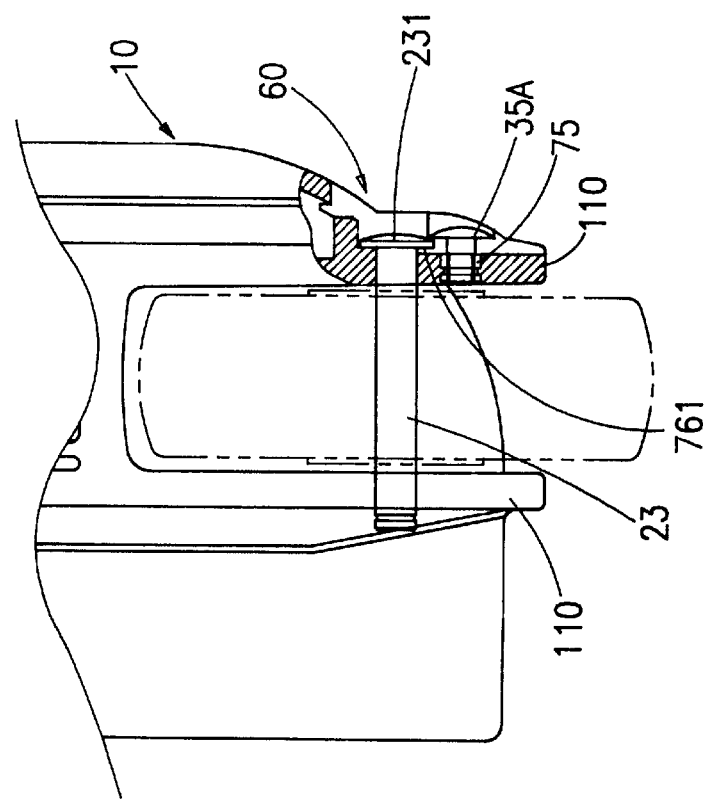
FIG. 9
FIG. 8

6,116,701

DETACHABLE LUGGAGE WHEEL STRUCTURE

BACKGROUND OF THE INVENTION

1. Field of the Invention

The present invention relates to a detachable luggage wheel structure, and more particularly to a wheel structure which can be detached from the exterior of the luggage.

2. Description of Related Art

A prior art luggage wheel structure as shown in FIG. 1 generally comprises a wheel E, an outer pedestal A, an inner pedestal B, and a number of screws C1 and C2. A pair of screws C1 are threadedly secured the inner pedestal B and the outer pedestal A together from the interior of a luggage frame D. A pair of screws C2 are threadedly secured the outer pedestal A and the inner pedestal B together from the exterior of the luggage frame D. In view of this, it is required to unfasten the wheels E—E from the interior and the exterior respectively in order to replace them when the screws C1 and C2 are wornout and/or malfunctioned. To the worse, it is inevitable to dismantle the interior lining of the luggage in order to unfasten the screws C1. As a result, the interior lining is damaged and may not be recovered to its original form. It is deemed to be inconvenient. Another prior art luggage wheel structure is shown in FIG. 2. Its advantage is that it is simply required to detach an axis S and sleeve M when replacing a wheel N. Further, its plate O is detachable. Furthermore, the plate O is threadedly secured to a hub P from the interior of a luggage frame Q. In view of this, it is not a perfect design due to the complexity of components and not so simplified detachment procedure. In addition when the wheels N are malfunctioned, it is necessary to unfasten the screws T—T from the interior of the luggage as mentioned above.

Thus, it is desirable to provide a detachable luggage wheel structure to overcome the above drawbacks of prior art.

SUMMARY OF THE INVENTION

It is therefore an object of the present invention to provide a detachable luggage wheel structure comprising a pedestal, a wheel assembly located on a lower part of the pedestal, a fixed member provided on the pedestal and near a fender, a bolt, and a block secured to the fixed member from below by the bolt for preventing the axis from unfastening. Moreover, the wheel detachment is complete simply by unfastening the bolt from the exterior of the luggage and extracting the wheel thereof.

It is another object of the present invention to provide a detachable luggage wheel structure comprising a pedestal, a wheel assembly located on a lower part of the pedestal, a lower section of the fender provided adjacently to an exterior side of the wheel assembly, a hubcap complementary to the lower section in shape provided on the surface of the lower section, and a screw for holding the lower section and hubcap together. Moreover, after the screw is unfastened, a flat tool is allowed to be inserted into a difference formed between a planar surface of the lower section and the head of the wheel axis for removing the wheel quickly.

The above and other objects, features and advantages of the present invention will become apparent from the following detailed description taken with the accompanying drawings.

BRIEF DESCRIPTION OF THE DRAWINGS

FIG. 3 is an exploded perspective view of a preferred embodiment of the present invention;

FIG. 3A is a partial enlarged view of FIG. 1;

FIGS. 4–6 are a serial of plan views showing the assembly procedures of a preferred embodiment of the present invention;

FIG. 7 is a side elevational view of FIG. 6;

FIG. 8 is a sectional view of another preferred embodiment of the present invention;

FIG. 9 is a side elevational view of FIG. 8;

DETAILED DESCRIPTION OF PREFERRED EMBODIMENTS

Figure 1:
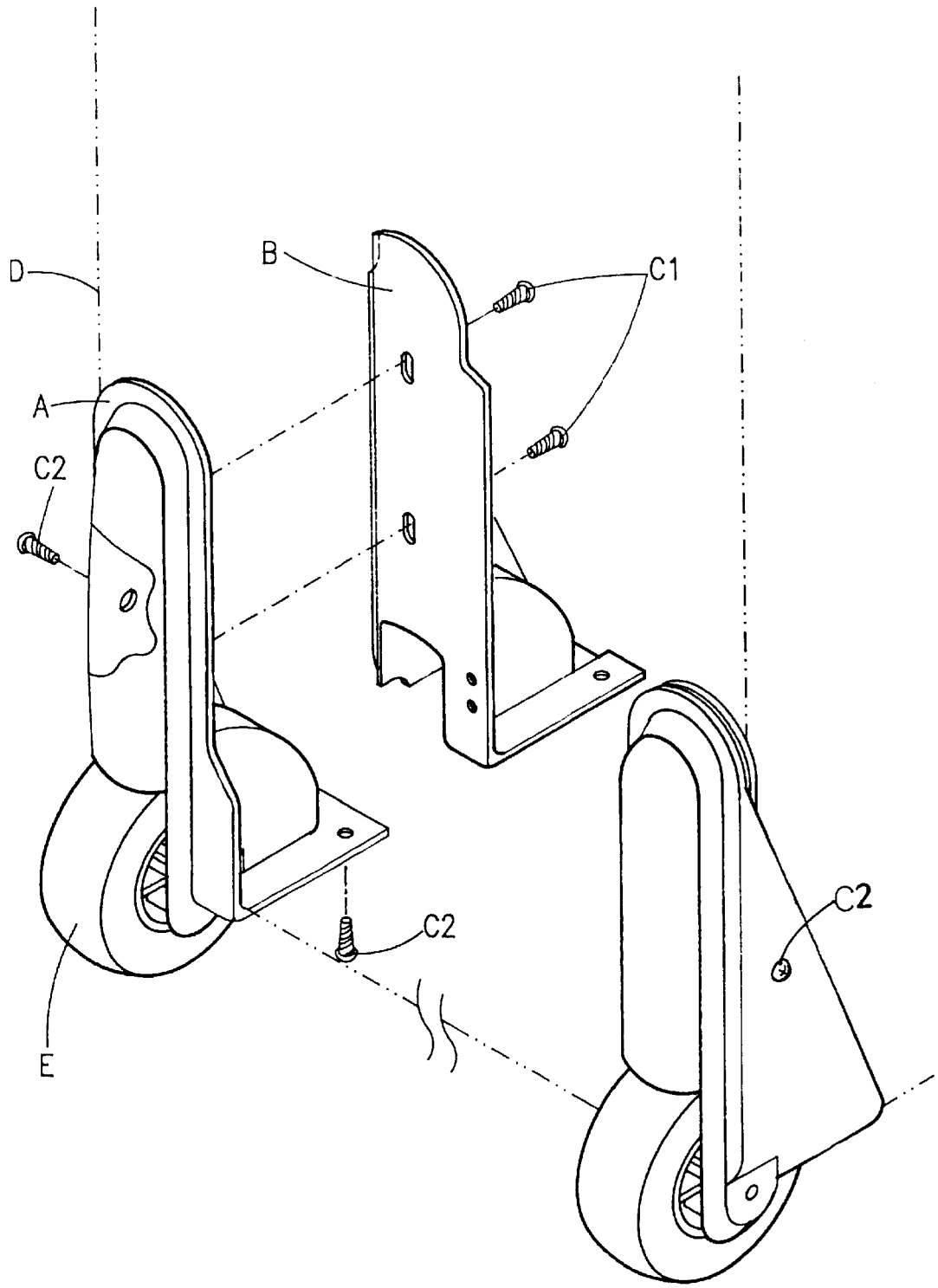
FIG. 1 is a perspective view of a prior art wheel structure.
Figure 2:
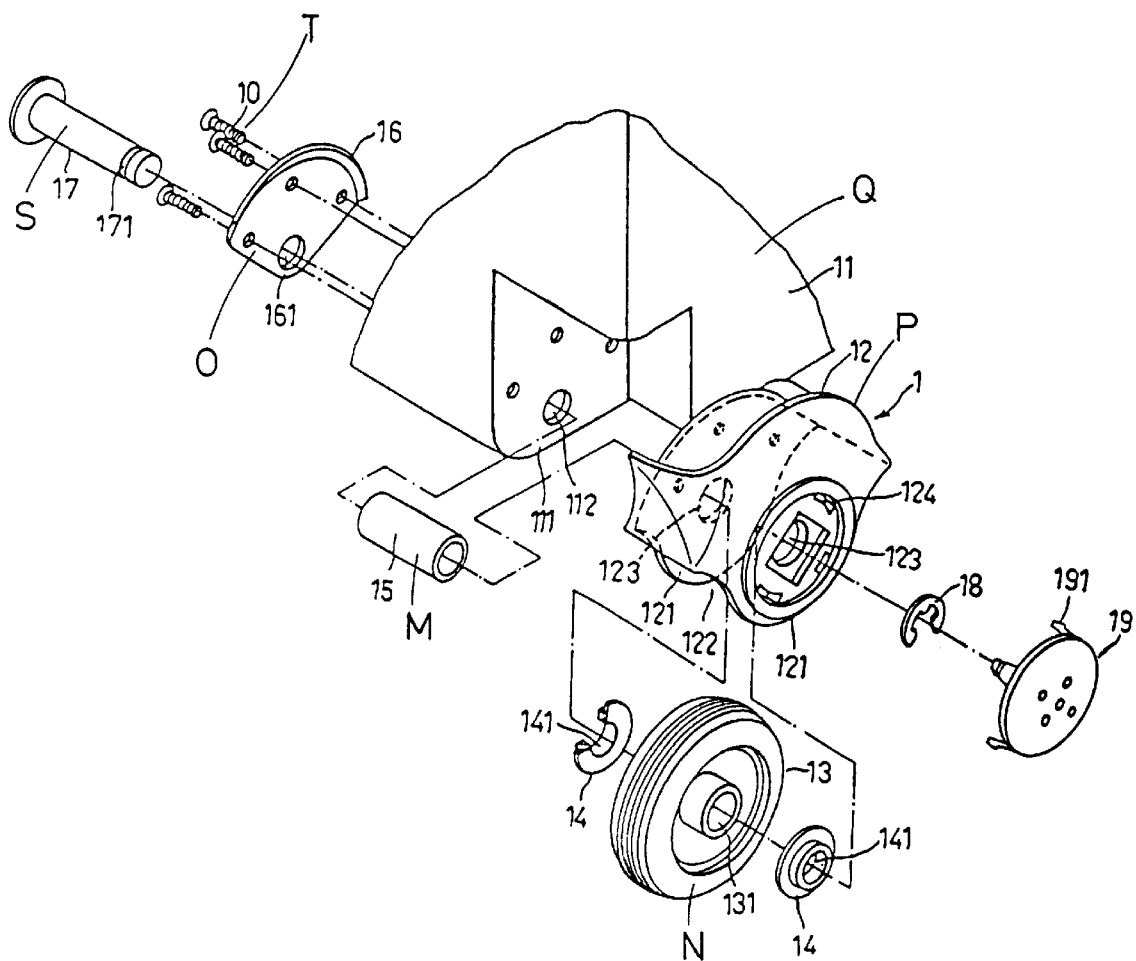
FIG. 2 is a perspective view of another prior art wheel structure.

Referring to FIGS. 3–7, there is shown a preferred embodiment of the present invention. The detachable luggage wheel structure comprises a pedestal 10, a wheel assembly 20, a block 30, and a fixed member 40. The pedestal 10 has a vertical member 11 and a horizontal member 12. The fixed member 40, provided on the lower part of the vertical member 11, are located near a fender 110.

The wheel assembly 20 comprises a wheel 21, a pair of bearings 22, and an axle 23. The wheel assembly 20 is received within an space 111 on the lower part 25 of the pedestal 10. The wheel assembly 20 is capable of turning on the axle 23. The axle 23 is inserted between a pair of opposite bores 46 and secured on the opposite fenders 110. The fixed member 40 has a horizontal member 44 and a pair of oppositely vertical members 41—41. At the bottom of said pair of vertical members 41—41, there is a horizontal slot 43, which is wider than the gap 42 formed between said pair of vertical members 41—41. A hole 45 extends downward from the center of horizontal member 44. A nut 36 is provided on the top of the hole 45 and located between the vertical members 41, and held within said horizontal slot 43. The diameter of the nut 36 is the same as the wideness of the slot 43.

The block 30 comprises a L shaped member 31 having a vertical part and a horizontal part; and a half cylindrical member 32 located on the horizontal part of the L shaped member 31. A counter-bore 34, as shown in FIGS. 4–6, provided on the bottom of the horizontal part of the L shaped member 31, is located between the vertical part of the L shaped member 31 and the half cylindrical member 32. A bolt 35 is allowed to insert through the counter-bore 34. Two concave part 311 and 312, which perpendicular to each other, are provided on the upper part of the L shaped member 31, as shown in FIG. 3.

A chamber 47, as shown in FIGS. 3 and 3A, is provided on the horizontal member 12 of the pedestal 10 for the purpose of receiving the block 30 when assembling.

Referring to FIGS. 4–7 specifically, upon completion the wheel assembly 20 by extending the axle 23 through a pair of opposite bores 46—46 and secured on the opposite fenders 110—110, there is shown the assembly of the block 30 with the fixed member 40. The rod 232 and a head 231 of the axle 23 sit in the concave part 311 and the concave part 312 respectively when the block 30 is mounted within the chamber 47. Then the bolt 35 is threaded through the counter-bore 34 and the nut 36 to hold the block 30 and the fixed member 40 together. As a result, the wheel assembly 20 is secured within the lower part of the pedestal 10.

In case of replacing the wheel 21, it is required neither to open the luggage nor dismantle the pedestal 10 or the interior lining of the luggage. It is simply required to unfasten the bolt 35 from the block 30 and remove the block 30 from the hole 47 so as to pull the axle 23 from the wheel assembly 20 for replacing the worn-out wheel 21 with a new one. From the above detail descriptions, it is readily to be noted that the assembly and disassembly of the wheel assembly 20 from the luggage are both quick and efficient.

Referring to FIGS. 8–9, there is shown another preferred embodiment of the present invention. A lower section 70 of the fender 110 is adjacent to an exterior side of the wheel assembly 20. A hubcap 60, which complementary to the lower section 70 in shape, is provided on the surface of the lower section 70 and on the head 231 of the axle 23 for being firmly engaged with the lower section 70.

Figure 11:
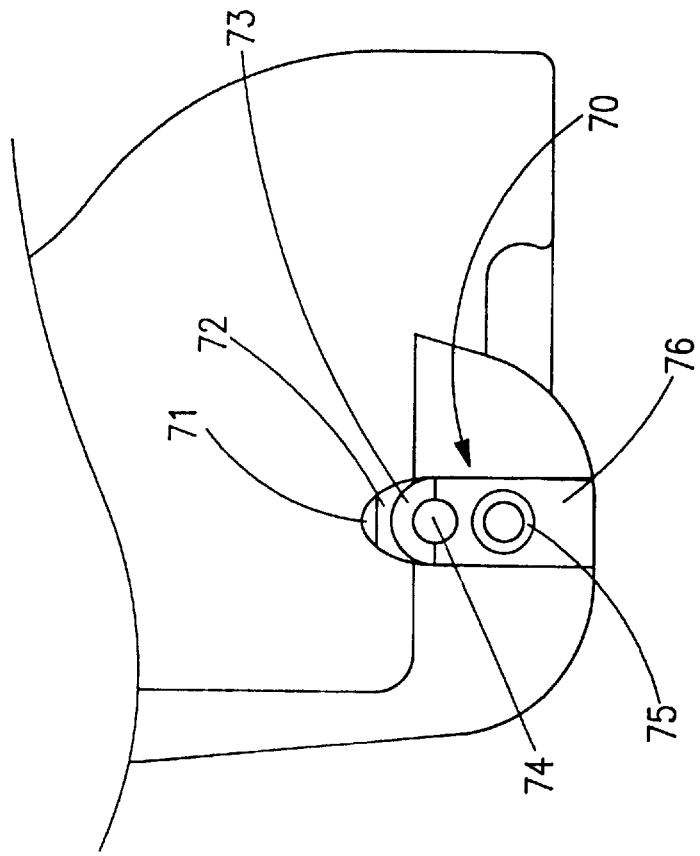
FIG. 11 is side elevational view of FIG. 10.
Figure 10:
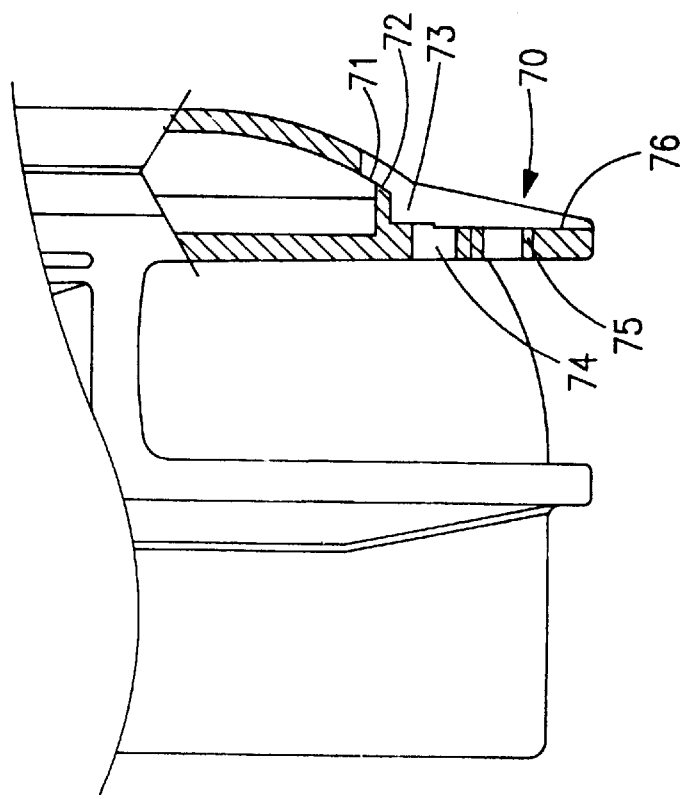
FIG. 10 is a sectional view of a fender of another preferred embodiment of the present invention.

Referring to FIGS. 10–11 specifically, the lower section 70 comprises a recessed part 71 on the top, an arc shape first higher part 72 located below the recessed part 71, an arc shape second higher part 73 located below the arc shape first higher part 72, a hole 74 located below the arc shape second higher part 73, a lower part 76 located below the hole 74, and a hole 75 located on the top of the lower part 76.

Figure 13:
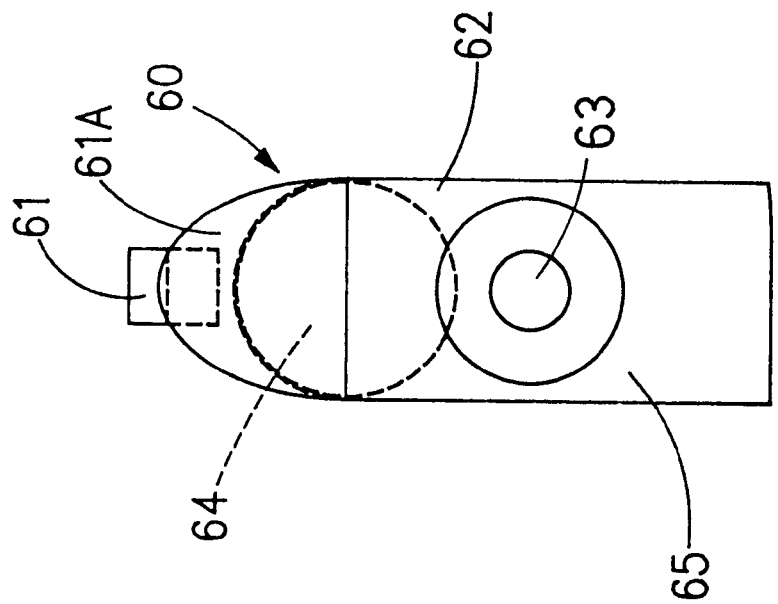
FIG. 13 is a plan view of the hubcap of another preferred embodiment of the present invention.
Figure 12:
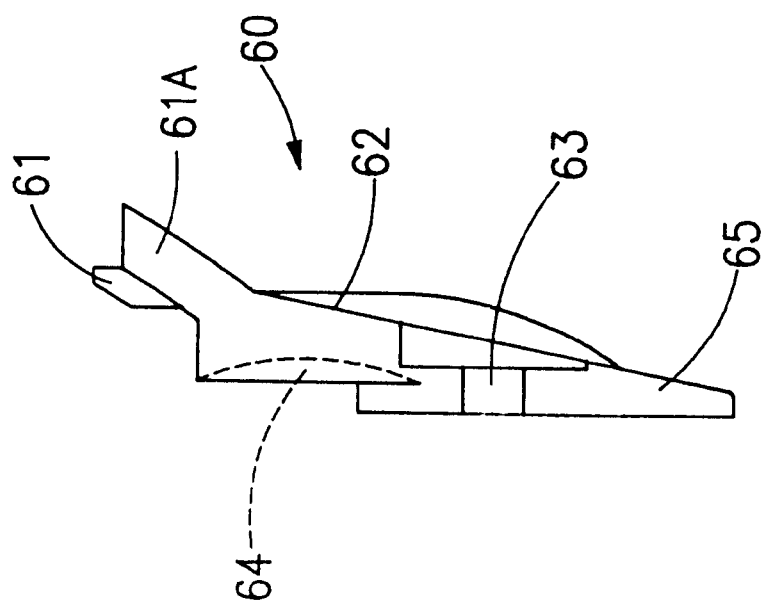
FIG. 12 is a side elevational view of a hubcap of another preferred embodiment of the present invention.

Referring to FIGS. 12–13 specifically, the hubcap 60 comprises an upper raised part 61 which located on the back of an upper portion 61A, a central portion 62, a concave part 64 is provided on the back of the central portion 62 for being sat by the head 231 of the axle 23, a lower part 65, and a hole 63 is provided in the lower part 65.

The assembly of the hubcap 60 with the lower section 70 is as follows:

Referring to FIGS. 10–13, cling the raised part 61 to the recessed part 71, thus providing the fit setting of the raised part 61 to the recessed part 71. Then, thread the screw 35A through the hole 63 to hold the hubcap 60 and the lower section 70 together, as shown in FIGS. 8 and 9. It is to be noted that the hubcap 60 is thus secured at the lower section 70 by the screw 35A so as to prevent the head 231 of the axle 23 from unfastening. As a result, the wheel assembly 20 is secured within the lower part of the pedestal 10.

In order to facilitate the replacement of the wheel assembly 20, it is designed that the second higher part 73 and the lower part 76 are located on two different planar surfaces. Accordingly, after the screw 35A is unfastened, a tool such as a flat screwdriver is allowed to be inserted into a gap 761 formed between the top of the lower part 76 and the head 231 of the axis 23 for removing the axle 23 quickly.

While the invention herein disclosed has been described by means of specific embodiments, numerous modifications and variations could be made thereto by those skilled in the art without departing from the scope of the invention set forth in the claims.

What is claimed is:

1. A detachable luggage wheel structure comprising:

a pedestal;

a bolt;

a wheel assembly having a wheel and an axle provided within a lower part of the pedestal;

a fixed member provided on an exterior side of the lower part of the pedestal;

a chamber provided on a horizontal member of the pedestal and located below the fixed member; and a block having a counter-bore;

wherein upon mounting the wheel assembly within a housing in the lower part of the pedestal, the block is received within the chamber and the bolt is threaded through the counter-bore of the block to hold the block and the fixed member together so as to secure the wheel assembly within the housing in the lower part of the pedestal.

2. The detachable luggage wheel structure of claim 1, wherein the block comprises a L shaped member having a vertical part and a horizontal part; and a half cylindrical member located on the horizontal part of the L shaped member.

3. The detachable luggage wheel structure of claim 2, wherein the counter-bore, provided on the horizontal part of the L shaped member, is located between the vertical part of the L shaped member and the half cylindrical member.

4. The detachable luggage wheel structure of claim 2, wherein a pair of concave parts, which perpendicular to each other, are provided on the upper part of the L shaped member for supporting the axis thereon.

5. A detachable luggage wheel structure comprising:

a pedestal;

a screw;

a wheel assembly having a wheel and an axle provided within a lower part of the pedestal;

a lower section, provided on an exterior side of the lower part of the pedestal, having an upper hole and a lower hole; and a hubcap complementary to the lower section in shape provided securely on the surface of the lower section;

wherein upon having the wheel assembly within a housing in the lower part of the pedestal, the axle of the wheel is inserted through the upper hole of the lower section and the screw is threaded through the lower hole of the lower section to hold the hubcap and lower section together so as to secure the wheel assembly within the housing in the lower part of the pedestal.

6. The detachable luggage wheel structure of claim 5, wherein the lower section further has a recessed part and the hubcap has a raised part which corresponding to the recessed part of lower section for providing the fit setting of the recessed part to the raised part.

7. The detachable luggage wheel structure of claim 5, wherein lower section further has a higher part and a lower part which located on two different planar surfaces for forming a difference between the lower part and the higher part for easy removing the wheel assembly.

8. The detachable luggage wheel structure of claim 5, wherein the upper hole is going through the difference of the higher part and the lower part.

\* \* \* \* \*